US007696986B2

(12) United States Patent
Lin et al.

(10) Patent No.: US 7,696,986 B2
(45) Date of Patent: *Apr. 13, 2010

(54) TOUCH SENSING APPARATUS USING VARYING SIGNAL DELAY INPUT TO A FLIP-FLOP

(75) Inventors: Shi-Quan Lin, Guangdong (CN); Shin-Hong Chung, Guangdong (CN); Han-Che Wang, Guangdong (CN); Kuan-Hong Hsieh, Guangdong (CN); Xin Zhao, Guangdong (CN)

(73) Assignees: Hong Fu Jin Precision Industry (Shen Zhen) Co., Ltd., Longhua Town, Bao'an District, Shenzhen, Guangdong Province, P.R.C.; Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 609 days.

This patent is subject to a terminal disclaimer.

(21) Appl. No.: 11/616,893

(22) Filed: Dec. 28, 2006

(65) Prior Publication Data
US 2007/0171209 A1 Jul. 26, 2007

(30) Foreign Application Priority Data
Jan. 21, 2006 (CN) ............... 2006 1 0033247

(51) Int. Cl.
*G06F 3/041* (2006.01)
(52) U.S. Cl. ............... 345/173; 178/18.01; 178/18.02; 324/415; 200/600

(58) Field of Classification Search ... 178/18.01–18.07, 178/20.01–20.04, 19.01–19.07; 345/173; 324/663, 415; 200/600
See application file for complete search history.

(56) References Cited

U.S. PATENT DOCUMENTS

| 4,081,700 A | * | 3/1978 | Hamilton, II | ............... 307/116 |
| 4,331,890 A | * | 5/1982 | Makino et al. | ............... 307/326 |
| 5,495,077 A | | 2/1996 | Miller et al. | |
| 5,790,107 A | * | 8/1998 | Kasser et al. | ............... 345/174 |
| 5,943,516 A | * | 8/1999 | Uchiyama et al. | ........... 396/281 |
| 6,534,970 B1 | | 3/2003 | Ely et al. | |
| 6,545,614 B1 | | 4/2003 | Kasai | |
| 6,885,365 B1 | * | 4/2005 | Kang | ............... 345/173 |
| 2006/0007181 A1 | * | 1/2006 | Jung et al. | ............... 345/173 |

* cited by examiner

*Primary Examiner*—Amare Mengistu
*Assistant Examiner*—Gene W Lee
(74) *Attorney, Agent, or Firm*—Winston Hsu

(57) ABSTRACT

A touch sensing apparatus is provided. The apparatus includes a flip-flop (15), a sensor (13), an AC signal (14), and a detector (16). The AC signal supplies AC signals to the flip-flop. The flip-flop outputs a first output signal at the output of flip-flop when the sensor is not touched. The sensor receives electricity signals from the object, and causes a delay of the AC signal inputted to the first input of the flip-flop, the delay of the AC signal to be inputted to the first input of the flip-flop further causes the flip-flop to output a second output signal at the output of the flip-flop. The detector detects a change from the first output signal to the second output signal at the output of the flip-flop and accordingly identifies a touch on the sensor.

8 Claims, 4 Drawing Sheets

TOUCH SENSING APPARATUS USING VARYING SIGNAL DELAY INPUT TO A FLIP-FLOP

BACKGROUND OF THE INVENTION

1. Field of the Invention

The present invention relates generally to touch sensing apparatuses, and particularly to a touch sensing apparatus for sensing electricity signals of an object.

2. Description of Related Art

There are several available types of touch-sensing apparatuses that may be employed for use as positional indicators in apparatus such as personal computers. Among them, resistive-membrane positioning sensors and capacitive positioning sensors are well known and typically used in several applications. However, the resistive-membrane positioning sensors generally have poor resolutions. In addition, surfaces of the resistive-membrane positioning sensors are often exposed to air, and therefore are easily worn out. Furthermore, resistive-membrane positioning sensors are relatively expensive.

A capacitive positioning sensor typically includes a substrate which supports a first and second interleaved, closely spaced, non-overlapping arrays of conductive plates. An insulating layer overlies the first and second arrays. When an outer surface of the insulating layer is touched, the capacitances of at least one of the columns of plates of the first array and one of the rows of plates of the second array underlying the insulating layer at a location being touched changes with respect to ambient ground. Based upon the measured capacitance of each column of the first array and row of the second array, a microcomputer produces output signals representing the coordinates of the location being touched. These output signals can be used, for example, to control a position of a cursor on a display screen of a personal computer or to make a selected function command. Although the capacitive positioning sensor has been designed to avoid being exposed in air and thereby to avoid being easily worn out, however, by overlying the insulating layer, the sensitivity of the touch sensing apparatus is reduced.

What is still needed is a touch sensing apparatus with reduced circuitry complexity, improved sense sensitivity, improved efficiency, and lower manufacturing costs.

SUMMARY OF THE INVENTION

A touch sensing apparatus is provided. A preferred embodiment of a touch sensing apparatus includes a flip-flop, an alternating current (AC) signal source, a sensor, a first integration circuit, and a second integration circuit. The flip-flop has a first input, a second input, and an output. The alternating current (AC) signal source is for supplying AC signals to the first input and the second input of the flip-flop. The sensor connects to the first input of the flip-flop and configured for receiving electricity signals from an object that touches the sensor. The first integration circuit connects the second input of the flip-flop to the AC signal source and for delaying the AC signal inputted to the second input of the flip-flop. The second integration circuit connects the first input of the flip-flop to the AC signal source and for delaying the AC signal inputted to the first input of the flip-flop. The detector electrically connects to the output of the flip-flop and is for detecting a change at the output of the flip-flop. The flip-flop outputs a first output signal at the output thereof when the sensor is not touched. The sensor receives electricity signals from the object, and causes a delay of the AC signal inputted to the first input of the flip-flop, the delay of the AC signal inputted to the first input of the flip-flop further causes the flip-flop to output a second output signal at the output thereof. The detector detects a change from the first output signal to the second output signal at the output of the flip-flop and accordingly identifies a touch on the sensor.

Other advantages and novel features will be drawn from the following detailed description of the preferred embodiment with reference to the attached drawings, in which:

DETAILED DESCRIPTION OF THE INVENTION

Figure 1:
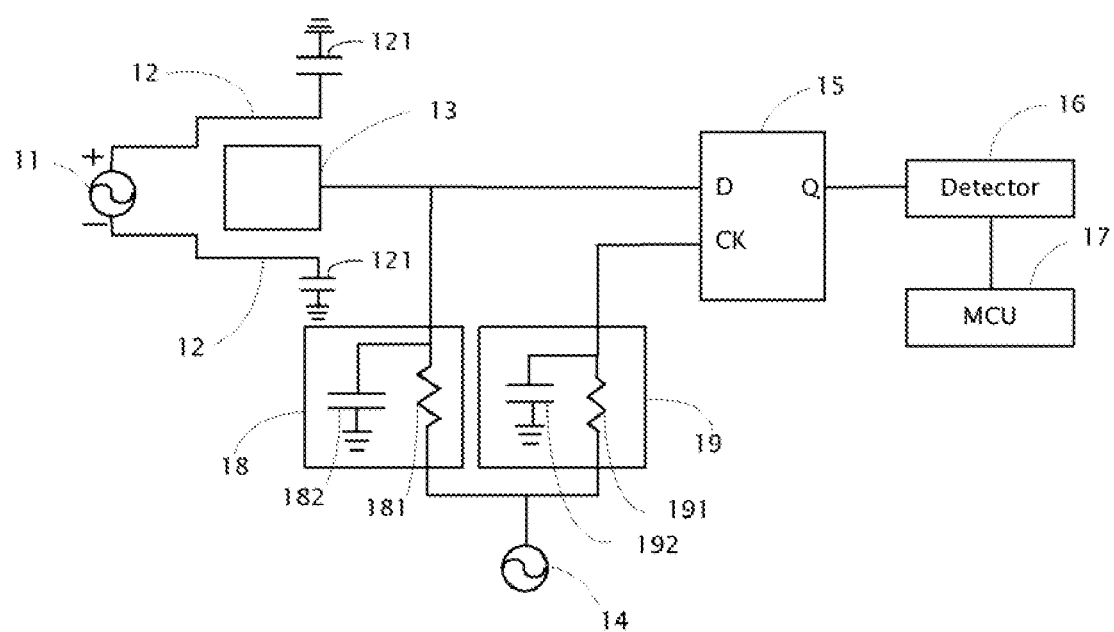
FIG. 1 is an exemplary circuit diagram of a touch sensing apparatus in accordance with a first preferred embodiment of the present invention.

FIG. 1 is an exemplary circuit diagram of a touch sensing apparatus in accordance with a first preferred embodiment of the present invention. The apparatus mainly includes a differential signal source 11, two conductors 12, a sensor 13, an alternating current (AC) signal source 14, a D-type flip-flop 15, a detector 16, a microcontroller unit (MCU) 17, a first integration circuit 18, and a second integration circuit 19.

The D-type flip-flop 15 includes a data signal input D (hereinafter "the input D"), a clock signal input CK (hereinafter "the input CK"), and an output Q. The differential signal source 11 has a positive output (labeled with "+") and a negative output (labeled with "−"). The conductors 12 each include a first terminal and a second terminal, the first terminal connects to the positive output or the negative output of the differential signal source 11 correspondingly and the second terminal respectively grounded via a capacitor 121. The sensor 13 is located between the conductors 12, and forms two parallel-arranged capacitors with the conductors 12. The sensor 13 is electrically connected to the input D of the D-type flip-flop 15.

The differential signal source 11 outputs a positive signal and a negative signal at the positive output and the negative output respectively. Generally, environmental noises are generated when an environment contains charged bodies such as electric lights and computers. The environmental noises are AC signals having irregular waveforms. When the environmental noises reach the parallel-arranged capacitors, positive half-waves and negative half-waves of the environmental noises are offset respectively by the positive signal and the negative signal outputted by the differential signal source 11. The touch sensing apparatus is thus, protected from being affected by the environmental noises and improves a sensitivity. However, when the circuit is placed in an environment with high-intensity environment noises, such as in a high cell phone signal environment, the parallel-arranged capacitors alone cannot offset the high-intensity environment noises, therefore capacitor 121 is provided to offset the high-intensity environment noise.

The AC signal source 14 is connected and applies AC signals simultaneously to the first integration circuit 18 and the second integration circuit 19. The first integration circuit 18 is further connected to the input D of the D-type flip-flop 15, and delays an active transition time between a logic high level (hereinafter simplified as "H") and a logic low level (hereinafter simplified as "L") of the AC signals inputted to the input D, i.e., the first integration circuit 18 prolongs the active transition time of the AC signals to be inputted to the input CK. For simplicity, the AC signals delivered by the first integration circuit 18 to the input D is hereinafter referred to as the D signals.

The second integration circuit 19 is connected to the input CK of the D-type flip-flop 15. The second integration circuit 19 prolongs the active transition time between H and L of the AC signals inputted to the input CK, i.e., the second integration circuit 19 prolongs the active transition time of the AC signals to be inputted to the input CK. For simplicity, the AC signals delivered by the second integration circuit 19 to the input CK is hereinafter referred to as the CK signals.

The first integration circuit 18 is comprised of a first resistor 181 and a first capacitor 182. Specifically, the first resistor 181 connects the AC signal source 14 to the input D and the first capacitor 182 connects the input D to ground. The second integration circuit 19 is comprised of a second resistor 191 and a second capacitor 192. Specifically, the second resistor 191 connects the AC signal source 14 to the input CK and the second capacitor 192 is connects the ground to the input CK. However, more broadly, according to a principle of the present invention, components of the first integration circuit 18 and the second integration circuit 19 are chosen and arranged to achieve a goal such that: when the sensor 13 is not touched, the active transition time of the CK signals is delayed for a predetermined time longer than (or equal to) active transition time of the D signal, thus resulting in a first output signal at the output Q of the D-type flip-flop 15.

Generally, charged bodies generates alternating magnetic fields. When an electrical conducting object such as a human body moves into the alternating magnetic field, inductive charges are generated and distributed on surfaces of the electrical conducting object, thus, improving electricity signals of the electrical conducting object. In the preferred embodiment, the differential signal source 11 provides such the alternating magnetic field, thus improving the electricity signals of the electrical conducting object that touches the sensor 13.

The sensor 13 and ground form a distributed capacitor. When the electrical conducting object touches the sensor 13, the inductive charges on the electrical conducting object flows to the sensor 13, thus causing a capacitance change of the distributed capacitor, and further causing a capacitance change of the first integration circuit 18. The first integration circuit 18 accordingly delays the active transition time of the D signals to be longer than the delay of the CK signals, thus resulting in a second output signal at the output Q of the D-type flip-flop 15. That is, a state change of the D-type flip-flop 15 is triggered. The detector 16 detects the state change of the D-type flip-flop 15, accordingly identifies a touch on the sensor 13 and then generates a corresponding signal to the MCU 17 to perform a predetermined operation.

Figure 2:
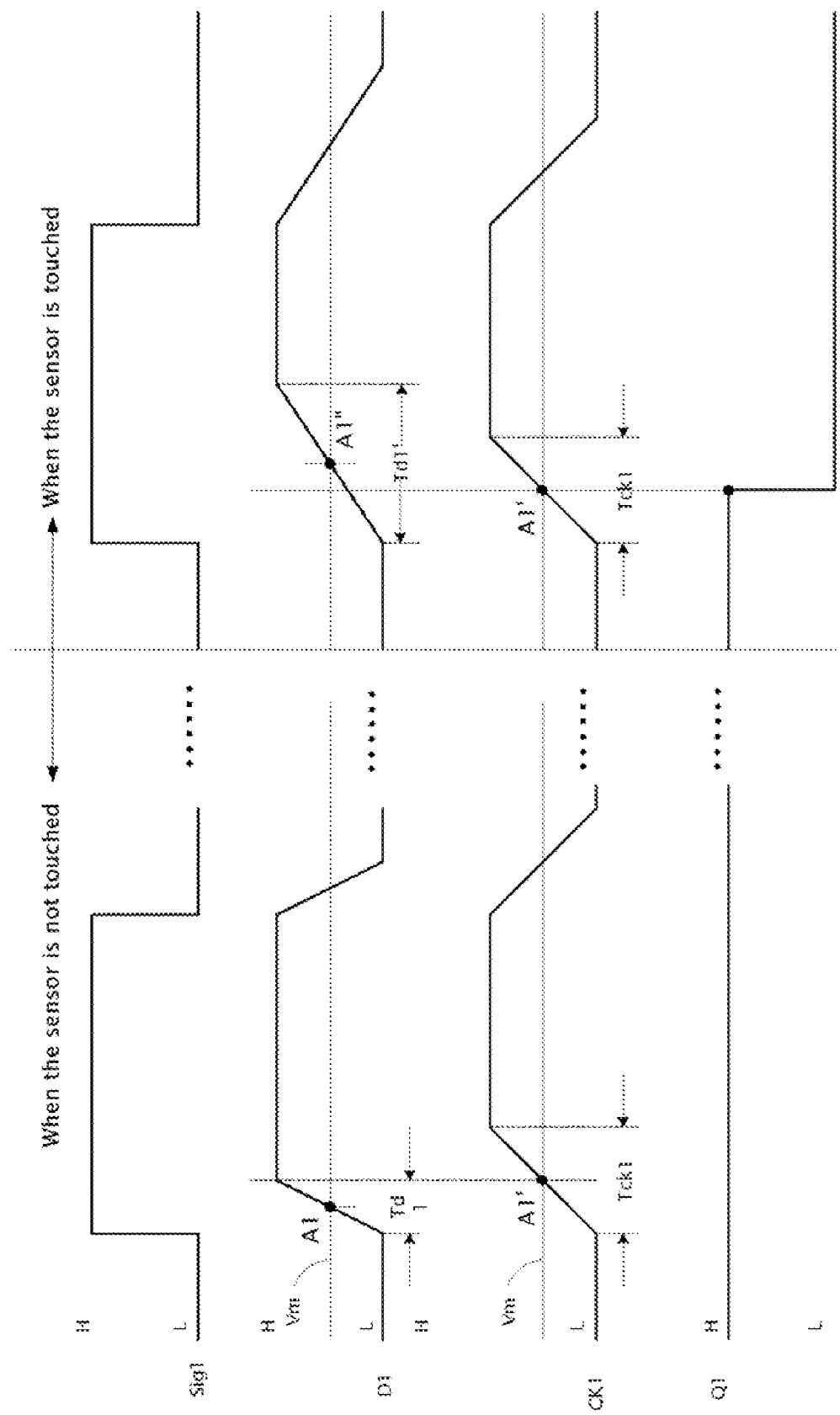
FIG. 2 is a waveform diagram of the input and output signals of the D-type flip-flop when the sensor is touched/not touched correspondingly by the electrical conducting object according to the FIG. 1.

FIG. 2 is a waveform diagram of the input and output signals of the D-type flip-flop 15 when the sensor 13 is touched/not touched correspondingly by the electrical conducting object according to the FIG. 1. For brevity, FIG. 2 shows the D-type flip-flop 15 is triggered by a positive-going transition (PGT) of the CK signals. However, persons skilled in the art will recognize that triggering the D-type flip-flop 15 by a negative-going transition (NGT) of the CK signals is also feasible.

In FIG. 2, waveform sig1 represents the AC signals generated by the AC signal source 14, waveform D1 represents the D signals, and waveform CK1 represents the CK signal. Line Vm represents a threshold voltage value and intersects with the Waveforms D1 and CK1 on a rising edge of the Waveforms D1, thus defining points A1 and A1'. In the preferred embodiment, point A1 is a transition point when the D signals change from L to H, and the point A1' is an active trigger point of the D-type flip-flop 15. Td1 and Tck1 indicate the PGT times of the D signals and the CK signals respectively when the sensor 13 is not touched. Td1 is shorter than Tck1 and accordingly, the point A1 happens before the point A'. The D-type flip-flop 15 is triggered to output an H signal as indicated by waveform Q1 at the point A1'.

When the sensor 13 is touched by the electrical conducting object, the active transition time of the D signals is prolonged to Td1' and longer than Tck1. An point A1", which is defined by the Line Vm intersecting with the Waveforms D1 and represents a transition point of the D signals when the sensor is touched, happens after the point A1'. As a result, at the point A1, the D-type flip-flop 15 is triggered to output an L signal indicated in waveform Q1.

Figure 3:
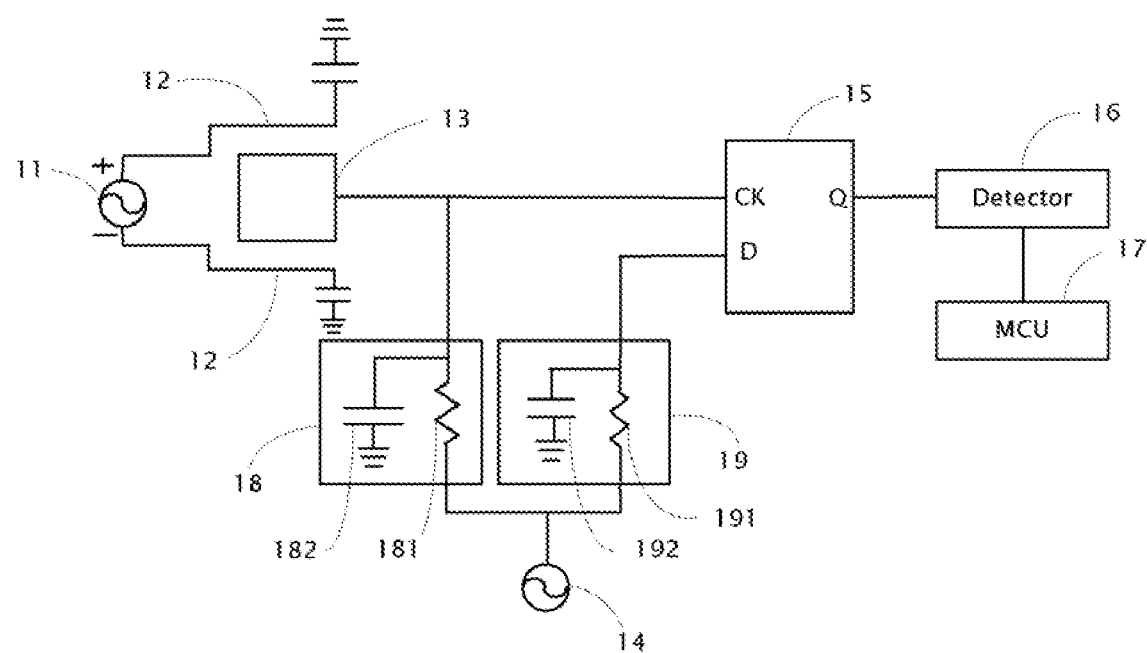
FIG. 3 is an exemplary circuit diagram of a touch sensing apparatus in accordance with a second preferred embodiment of the present invention.

FIG. 3 is an exemplary circuit diagram of the touch sensing apparatus in accordance with a second preferred embodiment of the present invention. As compared with FIG. 1, in this embodiment, the first integration circuit 18 is connected to the input CK of the D-type flip-flop 15, and the second integration circuit 19 is connected to the input D of the D-type flip-flop 15. The first integration circuit 18 delays the CK signal inputted to the input CK and the second integration circuit 19 delays the D signals to be inputted to the input D.

Figure 4:
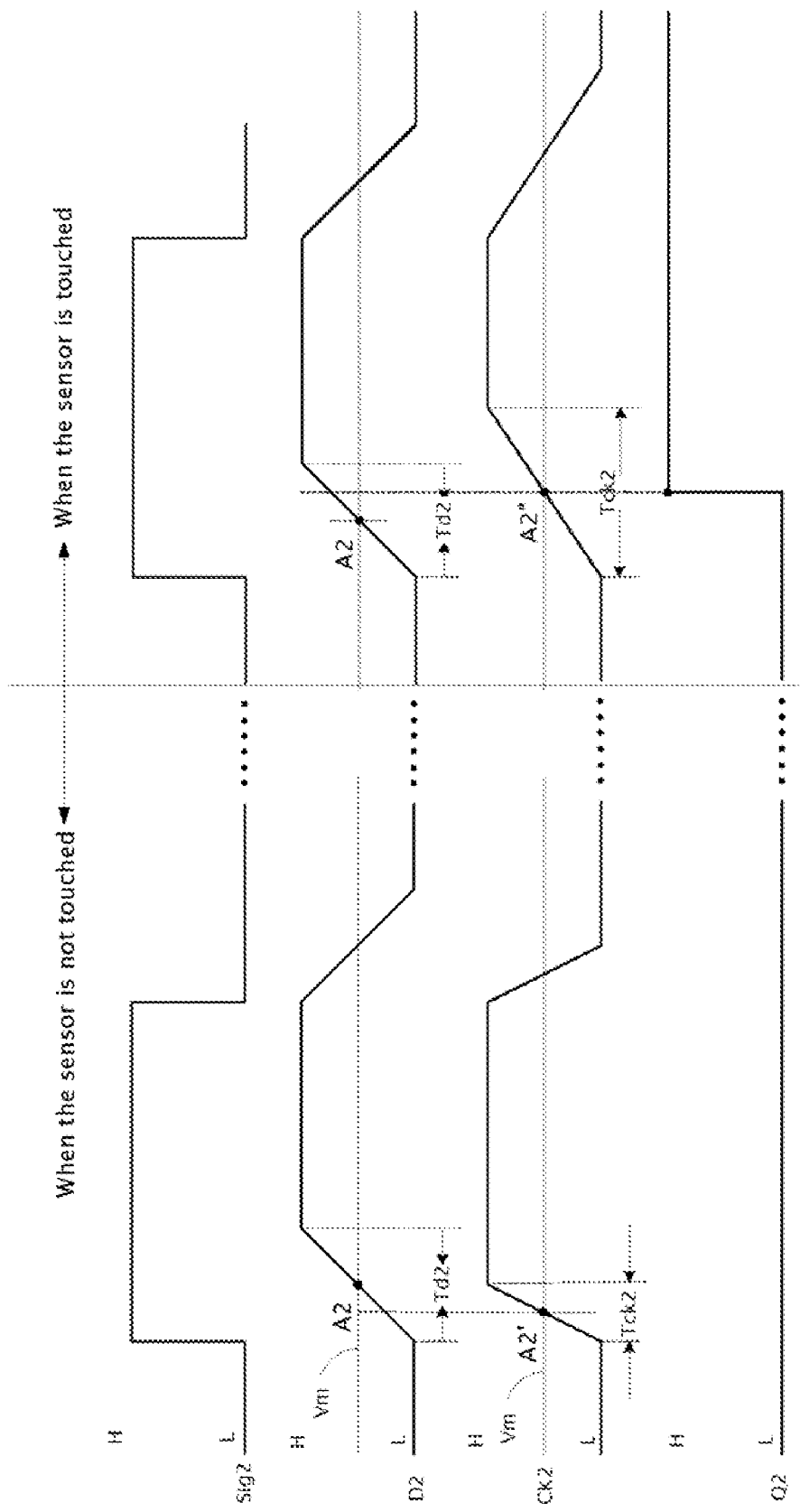
FIG. 4 is an waveform diagram of the input and output signals of the D-type flip-flop when the sensor is touched/not touched correspondingly by the electrical conducting object according to the FIG. 3.

FIG. 4 is a waveform diagram of the input and output signals of the D-type flip-flop 15 when the sensor 13 is touched/not touched correspondingly by the electrical conducting object according to the FIG. 3. Waveform sig2 represents the AC signals generated by the AC signal source 14, waveform D2 represents the D signal, and waveform CK2 represents the CK signal. Points A2 and A2' defined by the line Vm intersecting with the Waveforms D2 and CK2 respectively represent the transition point and the active trigger point of the D-type flip-flop 15. Td2 and Tck2 respectively indicate the PGT time of the D signals and the CK signals when the sensor 13 is not touched. In this embodiment, Td2 is longer than Tck2 and therefore, the intersecting point A2 is reached later in timing than the intersecting point A2'. As a result, at the point A2', the D-type flip-flop 15 is triggered to output an L signal indicated in waveform Q2.

When the sensor 13 is touched by the electrical conducting object, the active transition time of the CK signals is prolonged to Tck2' and longer than Td2. An intersecting point A2" represents the active trigger point of the CK signals when the sensor is touched and comes after the intersecting point A2 in timing. As a result, at the intersecting point A2", the D-type flip-flop 15 is triggered to output an H signal indicated by waveform Q2.

What is claimed is:
1. A touch sensing apparatus comprising:
a flip-flop having a first input, a second input, and an output;
an alternating current (AC) signal source for supplying AC signals to the first input and the second input of the flip-flop;

a sensor connected to the first inputs of the flip-flop and configured for receiving electricity signals from an object that touches the sensor;

a first integration circuit interposed between the second input of the flip-flop and the AC signal source and for delaying the AC signal inputted to the second input of the flip-flop;

a second integration circuit connecting the first input of the flip-flop to the AC signal source and for delaying the AC signal inputted to the first input of the flip-flop; and a detector electrically connected to the output of the flip-flop and for detecting a change at the output of the flip-flop;

wherein the flip-flop outputs a first output signal at the output thereof when the sensor is not touched;

the sensor receives electricity signals from the object, and causes a delay of the AC signal inputted to the first input of the flip-flop, the delay of the AC signal inputted to the first input of the flip-flop further causing the flip-flop to output a second output signal at the output thereof; and the detector detects a change from the first output signal to the second output signal at the output of the flip-flop and accordingly identifies a touch on the sensor.

2. The touch sensing apparatus as described in claim 1, further comprising a microcontroller unit (MCU) for executing a predetermined task after the detector identifies the touch on the sensor.

3. The touch sensing apparatus as described in claim 1, wherein the flip-flop is a D-type flip-flop.

4. The touch sensing apparatus as described in claim 1, further comprising a differential signal source configured for generating a positive signal and a negative signal.

5. The touch sensing apparatus as described in claim 4, further comprising two conductors each having a first terminal and a second terminal, the first terminal being connected to the positive signal or the negative signal of the differential signal source correspondingly.

6. The touch sensing apparatus as described in claim 5, further comprising two capacitors each respectively connected to the second terminal of the conductors.

7. The touch sensing apparatus as described in claim 6, wherein the sensor locates between the two conductors and forms two simulated capacitors with the two conductors for offsetting environmental noise.

8. The touch sensing apparatus as described in claim 4, wherein the differential signal source is further provided for providing an alternating magnetic field for the touch sensing apparatus.

* * * * *